United States Patent [19]

Boeglin et al.

[11] 3,853,490

[45] Dec. 10, 1974

[54] GRANULATION OF POTASSIUM SULFATE

[75] Inventors: Albert F. Boeglin; Edward A. Chowning; Sam E. Tschappler, all of Carlsbad, N. Mex.

[73] Assignee: International Minerals & Chemicals Corporation, Libertyville, Ill.

[22] Filed: Jan. 22, 1973

[21] Appl. No.: 325,504

[52] U.S. Cl.................... 23/313, 23/300, 23/301 R, 23/302, 71/61, 71/64 DA, 264/117
[51] Int. Cl. .......................... C01d 5/00, C01d 5/18
[58] Field of Search.......... 23/300, 313, 301 R, 302; 71/61, 64, 64 B; 264/117

[56] References Cited
UNITED STATES PATENTS

| | | | |
|---|---|---|---|
| 3,032,408 | 5/1962 | Baumann | 71/64 DA |
| 3,049,419 | 8/1962 | Raistrick | 71/64 DA |
| 3,085,870 | 4/1963 | Bradford | 23/313 |
| 3,271,106 | 9/1966 | Nylander | 423/197 |
| 3,317,307 | 5/1967 | Wise | 71/61 |
| 3,348,938 | 10/1967 | Sherrington | 71/64 DA |

*Primary Examiner*—Jack Sofer
*Assistant Examiner*—S. J. Emery
*Attorney, Agent, or Firm*—James E. Wolber; Peter Andress

[57] ABSTRACT

Potassium sulfate crystals are granulated by first preparing a potassium sulfate feed material sized such as it is at least 50% −6 +65 mesh, 10% to 30% −200 mesh, with the remainder being −65 +200 mesh. The sized crystals are wetted to a moisture content of 7 to 12 percent by weight of the crystals. A small amount of a surface active agent such as disodium 4-dodecylated oxydibenzene sulfonate is incorporated in the admixture, and the mass granulated and dried in a rotating, tubular granular drier. Product temperature is maintained below a maximum of 550°F. and the maximum temperature of gases contacting the product is maintained below 1,200°F.

6 Claims, No Drawings

GRANULATION OF POTASSIUM SULFATE

BACKGROUND OF THE INVENTION

It is frequently desirable that fertilizer ingredients be provided in granular form rather than as finely divided particulate solids. Finely divided solids tend to dust during handling and may tend to clog application equipment that frequently is designed to handle only granulated material.

Granulation of fertilizer components is known to the art and is disclosed, inter alia, in U.S. Pat. Nos. 2,107,701 and 2,207,702. Finely divided solids may be tumbled in a disc or drum-type granulator in the presence of a binder which often includes water or an aqueous solution or suspension of substance that acts as an adhesive to coalesce the particulate solids into granules. Following the tumbling operation the granules may be dried, if desired.

Inasmuch as fertilizer components are bulk materials, stringent economic standards restrict severely the choice of binders. Moreover, in order to maintain product grade it is desirable that the granule contains only a minimum of foreign binder. Finally, the granule must properly release the fertilizer values when applied to the ground. Economic and product grade and performance considerations so severely limit the field of choice that the economic manufacture of stable granules continues to present a meaningful technical challenge.

Potassium sulfate of standard commercial quality must be at least 50% $K_2O$. Since attractive commercial processes for the production of bulk potassium sulfate leave little leeway above this purity standard, the incorporation of as little as ½ of 1 percent of binding material (other than potash) must be expected to present serious problems of maintaining product grade. Accordingly, the central requirement of any granulation process is that the binder constituent, if it is other than a potassium compound, be present in an amount less than ½ of 1 percent. This is a stringent requirement.

Wise, et al., U.S. Pat. No. 3,317,307, describe a process for the production of granular fertilizer materials wherein the actual granulation step may be carried out in the initial portion of a rotary drier, and flame impingement upon the freshly produced pellets is avoided to avoid pellet disintegration. It has been found that these expedients are desirably employed in the process of this invention. The process of the aforementioned patent, however, requires the incorporation of diluents in amounts that cannot ordinarily be tolerated in potassium sulfate products of commercial grade.

It has further been found, quite apart from the problem of product purity degradation by binder addition, that potassium sulfate fines do not granulate readily, but tend to form granules which are outside of the desired size ranges and which are also lacking in sufficient green strength to permit drying of the particles without excessive breakdown. Accordingly, efforts to produce granular potassium sulfate of granular and standard size ranges from potassium sulfate crystals which are essentially −65 mesh (throughout this specification Tyler mesh is employed) result in poor granulation and a product of inadequate degradation resistance.

In accordance with this invention it has been determined that granular potassium sulfate of desired size ranges and with outstanding resistance to granule degradation can be produced by a method which comprises establishing a mass of potassium sulfate crystals characterized by (1) a crystal size distribution which is at least 50% by weight −6 +65 mesh, about 10 to 30 percent by weight −200 mesh, with the remainder being essentially −65 +200 mesh; (2) a moisture content in the range of about 7 percent to about 12 percent by weight of the crystals; and (3) the presence of a surface active agent capable of substantially enhancing potassium sulfate crystal growth in the amount of about 0.025 to 0.075 percent by weight of the crystals, rolling the mass in a confined rolling bed on a substantially smooth moving surface to form granules, and drying the granules to a moisture content of less than about ½ of 1 percent by heat exchange with hot combustion gases, the maximum temperature of gases in contact with said granules being maintained at less than 1,200°F., and the maximum temperature of said granules during drying being maintained at less than about 550°F.

In the practice of this invention the granulation step may be carried out in conventional granulating equipment, such as a drum granulator. The drying step may be carried out in a conventional counter-current rotary drier. It is preferred, however, that the mass to be granulated be introduced directly to a single rotating cylindrical vessel which is both the granulator and drier. The configuration of such a vessel may be that of a conventional counter-current rotary drier, provided however that there must be no flights or lifters over that portion of the vessel into which the crystal mass is introduced and granulation takes place. Thus, a substantially smooth moving surface will be provided for the granulation step and will preferably be maintained over a sufficient length of the drier to impart some drying and hardening to the granules. Thereafter conventional flights or lifters may be employed as desired.

By the phrase "surface active agent capable of substantially enhancing potassium sulfate crystal growth," is meant that class of materials which, when present in very small amounts in a potassium sulfate crystallization step, will substantially increase the size of the product crystals. Many such surface active agents are known, and over 50 specific compounds of this class are disclosed in the patent to Nylander, No. 3,271,106. Especially preferred is disodium 4-dodecylated oxydibenzene sulfonate. The surface active agent should be incorporated or otherwise present in the crystal mass in an amount in the range of 0.025 to 0.075 percent by weight of the crystals.

The moisture (water) content of the crystal mass will be in the range of 7 to 12 percent, and more preferably in the range of 7 ½ to 9 percent, based on the weight of the crystals. This moisture content, which may be obtained by the simple addition of water, is however preferably obtained by incorporating or otherwise providing in the crystal mass mother liquor from which potassium sulfate has been crystallized. The mother liquor should be uniformly distributed throughout the crystal mass. This may be accomplished, if necessary, by mixing in a pug mill.

In a preferred embodiment of the instant invention a filter or centrifuge cake obtained by a process, such as that described in the aforementioned Nylander patent, is employed directly as a feed material to the granulation step.

As will become apparent by examination of data hereinafter provided, it is essential to the practice of the instant invention that the temperature of gases contacting the potassium sulfate granules in the drying step be at a temperature below about 1,200°F. Higher temperatures result in a product which degrades excessively, i.e., a selected fraction, say the 8 × 10 mesh fraction, displays a physical degradation in the amount of substantially more than about 10 percent in a degradation test. Moreover, it is important that the granules during the drying operation do not reach a maximum temperature in excess of 550°F. Violation of these temperature criteria results in the production of lesser quantities of granules within the desired size ranges, and those granules that are formed possess inadequate degradation resistance.

As an example of this invention a potassium sulfate crystal mass containing disodium 4-dodecylated oxydibenzene sulfonate in the amount of 0.05 percent by weight of the crystals, and containing moisture in the amount specified and having the screen analyses hereinafter specified, was introduced into a counter-current rotary gas-fired drier. The drier was of pilot plant size, being 1 ¼ ft. in diameter and 8 ft. long. The results of 17 runs made in this granulator-drier are set forth in the following table.

The feed rate of potassium sulfate crystals to the drier was maintained at about 20 lbs. per minute, based upon dry weight of the crystals. Drier speed was maintained at about 25 to 30 r.p.m.

What is claimed is:

1. A method of granulating potassium sulfate comprising establishing a mass of potassium sulfate crystals characterized by (1) crystal size distribution of at least 50 percent by weight −6 +65 mesh, about 10 to about 30 percent by weight −200 mesh, with the remainder being essentially −65 +200 mesh; (2) a moisture content in the range of about 7 to about 12 percent by weight of the crystals; and (3) the presence of a surface active agent capable of substantially enhancing potassium sulfate crystal growth in the amount of about 0.025 to about 0.075 percent by weight of the crystals, rolling said mass in a confined bed on a substantially smooth moving surface to form granules, and drying said granules to a moisture content of less than about ½ of 1 percent by heat exchange between said granules and hot combustion gases, the maximum temperature of gases in contact with said granules being maintained at less than about 1,200°F., and the maximum temperature reached by said granules in the drying step being maintained below about 550°F.

2. The method in accordance with claim 1 in which said mass is subject to heat exchange with combustion gases at a temperature less than about 1200°F. during the granulation step.

3. The method in accordance with claim 2 in which said crystal mass contains moisture in the amount of about 7.5 to 9 percent by weight of the crystals.

4. The method in accordance with claim 3 in which said surface active agent is present in the amount of about 0.05 percent by weight of the crystals.

5. The method in accordance with claim 4 in which said surface active agent is disodium 4-dodecylated oxydibenzene sulfonate.

6. The method in accordance with claim 5 in which the moisture content of said mass is derived from mother liquor from which potassium sulfate is crystallized.

Table I.

| Test No. | %H$_2$O | SCREEN ANALYSES IN FRACTION % | | | | | | | | (MAXIMUM) DRYING TEMPERATURES °F | | Degr. of 8x10M | % H$_2$O in 8x10M | ESTIMATED % FRACTION After Crushing +6 Mes | | |
|---|---|---|---|---|---|---|---|---|---|---|---|---|---|---|---|---|
| | | Crystal Mass | | | | Drier Product | | | | Inlet gas | Exit gas | Product | | | 6x14 | 14x65 | −65 |
| | | +6 | 6x14 | 14x65 | −65 | +6 | 6x14 | 14x65 | −65 | | | | | | | | |
| 1 | 7.88 | 0.4 | 24.2 | 39.3 | 36.1 | 37.5 | 32.2 | 22.8 | 7.5 | 950 | 165 | 370 | 11.1 | 0.37 | 45 | 40 | 15 |
| 2 | 7.88 | 0.4 | 24.2 | 39.3 | 36.1 | 38.9 | 33.5 | 18.2 | 9.3 | 910 | 180 | 430 | 12.0 | 0.24 | 45 | 35 | 20 |
| 3 | 8.80 | 0.2 | 14.1 | 45.4 | 40.3 | 33.0 | 25.2 | 36.7 | 5.2 | 1000* | -- | 470 | 11.2 | 0.22 | 35 | 45 | 20 |
| 4 | 8.80 | 0.2 | 14.1 | 45.4 | 40.3 | 31.3 | 26.4 | 36.1 | 6.2 | 920 | 210 | 390 | 11.5 | 0.32 | 35 | 45 | 20 |
| 5 | 9.00 | 0.4 | 19.2 | 32.9 | 47.5 | 17.9 | 30.9 | 48.4 | 2.7 | 1400 | 220 | 870 | 65.8 | 0.10 | 30 | 45 | 25 |
| 6 | 9.00 | 0.4 | 19.2 | 32.9 | 47.5 | 20.5 | 31.3 | 45.1 | 3.1 | 1190 | -- | 615 | 34.0 | 0.25 | 35 | 50 | 15 |
| 7 | 8.12 | -- | 1.3 | 63.6 | 35.1 | 29.5 | 22.3 | 45.5 | 2.7 | 1420 | 300 | 840 | 70.2 | 0.025 | 30 | 45 | 25 |
| 8 | 8.12 | -- | 1.3 | 63.6 | 35.1 | 34.4 | 23.3 | 39.0 | 3.3 | 1190 | 250 | 660 | 28.8 | 0.14 | 35 | 50 | 15 |
| 9 | 6.94 | -- | 7.1 | 66.9 | 26.0 | 22.2 | 25.8 | 50.8 | 1.2 | 1100 | 245 | 593 | 16.6 | 0.18 | 35 | 55 | 10 |
| 10 | 6.94 | -- | 7.1 | 66.9 | 26.0 | 13.8 | 18.7 | 64.2 | 3.4 | 1430 | 285 | 914 | 53.0 | 0.14 | 20 | 55 | 25 |
| 11 | 8.14 | -- | 4.3 | 54.7 | 41.0 | 22.1 | 24.6 | 51.7 | 1.6 | 1120 | 190 | 468 | 10.9 | 0.36 | 35 | 55 | 10 |
| 12 | 8.14 | -- | 4.3 | 54.7 | 41.0 | 21.6 | 23.0 | 52.9 | 2.5 | 1120 | 175 | 507 | 11.5 | 0.325 | 35 | 55 | 10 |
| 13 | 6.76 | -- | 4.6 | 53.5 | 41.9 | 21.3 | 21.7 | 54.9 | 2.1 | 1220 | 245 | 619 | 20.2 | 0.16 | 30 | 55 | 15 |
| 14 | 6.76 | -- | 4.6 | 53.5 | 41.9 | 24.4 | 26.3 | 48.1 | 1.2 | 1020 | 185 | 446 | 14.4 | 0.16 | 35 | 55 | 10 |
| 15 | 9.08 | tr | 19.6 | 34.6 | 45.8 | 22.9 | 35.5 | 38.5 | 3.1 | 1220 | 170 | 400 | 10.4 | 0.28 | 40 | 45 | 15 |
| 16 | 9.08 | tr | 19.6 | 34.6 | 45.8 | 22.9 | 35.5 | 38.5 | 3.1 | 1230 | 190 | 480 | 12.2 | 0.38 | 40 | 45 | 15 |
| 17 | 7.50 | 0.2 | 26.2 | 43.0 | 30.6 | 26.1 | 30.0 | 42.2 | 1.7 | 1220 | 165 | 457 | 10.8 | 0.34 | 40 | 50 | 10 |

* just over

* * * * *